United States Patent
Schlarb et al.

(10) Patent No.: US 6,243,145 B1
(45) Date of Patent: Jun. 5, 2001

(54) METHOD AND APPARATUS FOR BROWSING TELEVISION CHANNEL INFORMATION BY CATEGORY

(75) Inventors: John M. Schlarb, Duluth; Arturo A. Rodriguez, Norcross, both of GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/071,602

(22) Filed: May 1, 1998

(51) Int. Cl.[7] ........................................ H04N 5/50
(52) U.S. Cl. .................. 348/906; 348/563; 348/564; 348/10; 348/13; 345/327
(58) Field of Search ................ 348/6, 7, 10, 12, 348/13, 563, 564, 565, 906, 569, 731, 734, 1; 455/6.2, 6.3, 4.1, 4.2, 5.2, 5.1; 345/327

(56) References Cited

U.S. PATENT DOCUMENTS

| | | | |
|---|---|---|---|
| 5,353,121 | 10/1994 | Young et al. | 348/563 |
| 5,589,893 * | 12/1996 | Gaughan et al. | 348/569 |
| 5,623,613 | 4/1997 | Rowe et al. | 395/353 |
| 5,673,089 * | 9/1997 | Yuen | 348/734 |
| 5,798,785 * | 8/1998 | Hendricks | 348/6 |
| 5,822,123 * | 10/1998 | Davis et al. | 348/906 |
| 5,844,620 * | 12/1998 | Coleman | 348/461 |
| 5,850,218 * | 1/2000 | Lajoie et al. | 348/906 |
| 5,857,182 * | 1/1999 | DeMichiel | 707/3 |
| 5,880,768 * | 3/1999 | Lemmons | 348/1 |
| 5,903,314 * | 5/1999 | Niijima | 348/564 |
| 5,986,650 * | 11/1999 | Ellis et al. | 348/734 |
| 6,014,184 * | 1/2000 | Knee et al. | 348/731 |

FOREIGN PATENT DOCUMENTS

| | | |
|---|---|---|
| 0790738 | 8/1997 | (EP) . |
| WO 9749242 | 12/1997 | (WO) . |

* cited by examiner

*Primary Examiner*—Matthew Luu
*Assistant Examiner*—Wesner SaJous
(74) *Attorney, Agent, or Firm*—Kelly A. Gardner; Kenneth M. Massaroni; Hubert J. Barnhardt, III

(57) ABSTRACT

A cable television system (100) includes a display (235) for displaying program information, a terminal (120) for controlling the presentation of the program information, a memory (240) for storing operational parameters, and a receiver (220) for receiving user inputs. A method for presenting the program information within the cable television system (100) includes the steps of storing the program information, including channel information and category information indicative of categories and channels associated with the categories, receiving (510) a command indicating that channel information is to be presented, and driving (520) the display (235) to present only program information associated with channels included in a selected category. The display (235) can, for instance, be driven with a browse banner (310) or a program guide that includes channel information about channels included in the selected category and omits channel information about channels not included in the selected category.

22 Claims, 8 Drawing Sheets

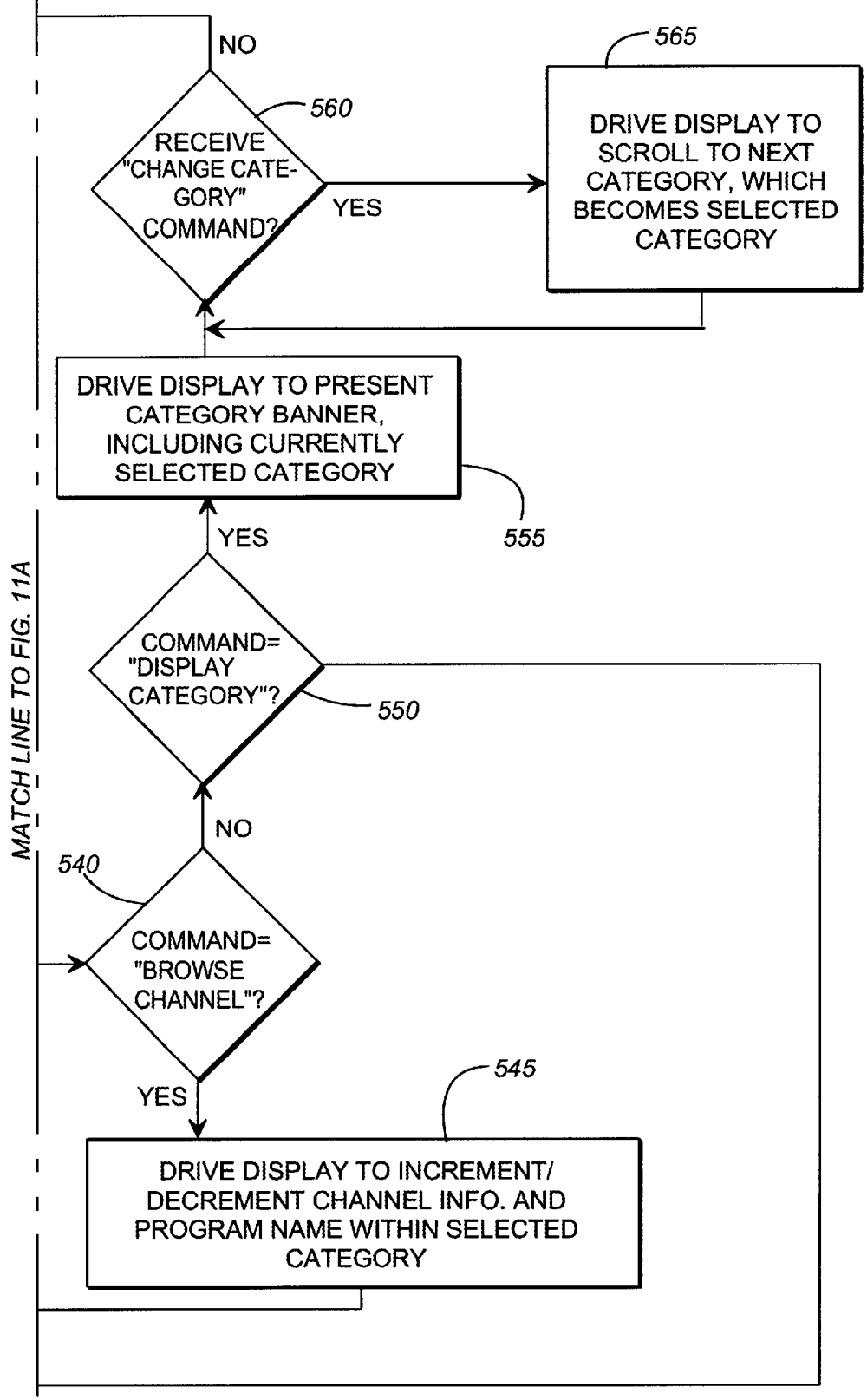

METHOD AND APPARATUS FOR BROWSING TELEVISION CHANNEL INFORMATION BY CATEGORY

FIELD OF THE INVENTION

This invention relates generally to television systems, and more specifically to program guides for such systems.

BACKGROUND OF THE INVENTION

Cable televisions systems receive satellite signals from which television signals are obtained for transmission to system subscribers. Cable television systems typically include a headend for receiving and demodulating the satellite signals to baseband, then transmitting the signals via communication media to subscriber equipment that tunes into television channels for display to the subscriber. The signals to the subscriber can be transmitted, for instance, over coaxial cables, fiber optic cables, or a combination of the two, and taps situated along the communication media split off the signals to provide subscriber drops. Signals to a subscriber can be provided directly to a cable-ready television, a cable-ready video cassette recorder (VCR), or a set top terminal connected to a television or other display device, such as a computer.

Many cable television systems provide television program information to subscriber equipment so that the subscriber can view the program information on the television itself. This program information is typically organized for presentation purposes into a program guide format that presents the program information by time and channel. The program guide can, for instance, automatically scroll through the available television channels to present the program information, such as name and description, at the current time.

With the advent of "browsers" for use in cable television systems, subscribers can linearly scan program information by time and channel while viewing the tuned channel. In systems, such as analog systems, that offer a limited number of cable television channels, these browsers permit the subscriber to easily scan the available programs one-by-one in order of channel number. However, many digital systems can provide hundreds or even thousands of channels. In such systems, scanning program information by channel number can require hundreds of keystrokes by the subscriber and can consume a tremendous amount of time. Furthermore, locating a particular channel can be quite difficult if the subscriber does not already know the channel number of the channel for which he or she is searching.

Thus, what is needed is an improved way to view and scan program information by channel in a cable television system that provides a large number of available channels.

DETAILED DESCRIPTION OF A PREFERRED EMBODIMENT

Figure 1:
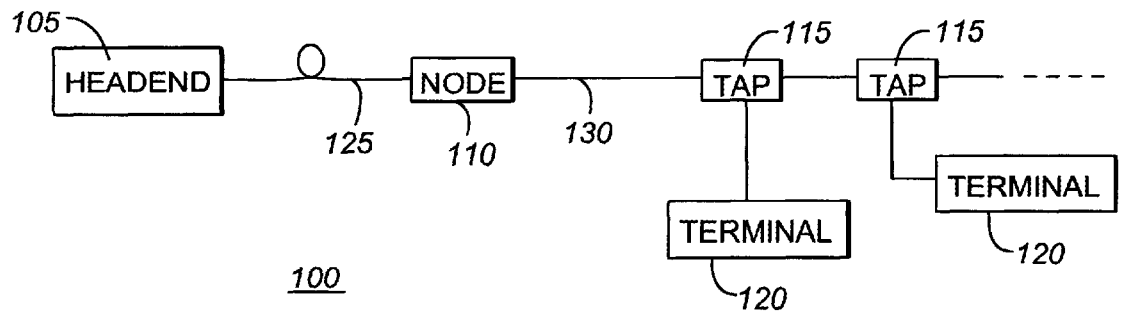
FIG. 1 is a block diagram of a cable television system in accordance with the present invention.

FIG. 1 is a block diagram of a cable television system 100 including a headend 105 for receiving satellite television signals, demodulating the signals down to baseband, and transmitting the signals over the system 100. The transmitted signals can, for instance, be radio frequency (RF) signals, although they are more preferably optical signals that are transmitted over a communication medium such as fiber optic cable 125. When optical signals are transmitted by the headend 105, one or more nodes 110 are included in the system 100 for converting the optical signals to RF signals that are thereafter routed over other media, such as coaxial cables 130. Taps 115 are provided within the cable system 100 for splitting the RF signal off to subscriber equipment, such as set top terminals 120, cable-ready televisions, video cassette recorders (VCRs), or computers.

Figure 2:
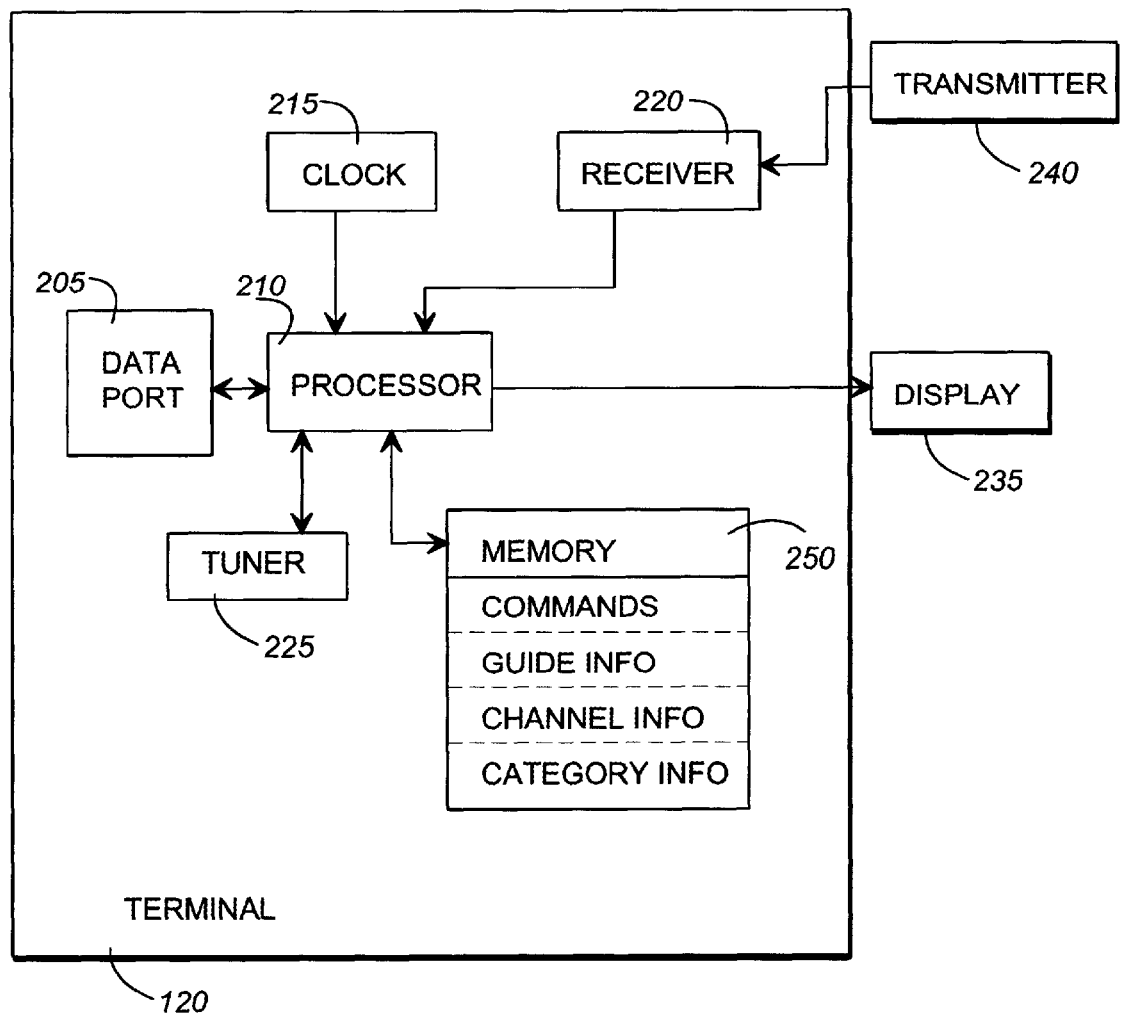
FIG. 2 is an electrical block diagram of a set top terminal included in the cable television system of FIG. 1 in accordance with the present invention.

Referring next to FIG. 2, a block diagram of the terminal 120 and other system equipment is shown. The terminal 120 is typically situated within the residence or business of the subscriber. It may be integrated into a device that has a display 235, such as a television set, or it may be a stand-alone unit that couples to an external display 235, such as a display included in a computer or a television, and that processes television signals for presentation to a subscriber on the display 235. The terminal 120 preferably comprises a data port 205 for receiving the RF signals, which can include video, audio, and data information, from the tap 115 and for providing any reverse information to the tap 115 for transmission back to the headend 105. The terminal 120 further includes a processor 210 for controlling operations of the terminal 120 and for driving the display 235, a clock 215 for providing timing functions, and a tuner 225 for tuning into a particular television channel to be displayed. Additionally, the terminal 120 includes a receiver 220 for receiving externally-generated information, such as user inputs or commands from other devices. User inputs could, for example, be provided via a controller or transmitter 240, such as buttons or keys located on the exterior of the terminal 120 or a handheld remote control device that includes user-actuated buttons.

A memory 250, such a non-volatile random access memory, coupled to the processor 210 stores operational parameters, such as commands that are recognized by the processor 210. The memory 250 also stores program information that can, for instance, be downloaded over the system 100 to the terminal 120. The program information includes program guide information that is displayed to the subscriber in the format of a program guide including a listing of channels, programs for viewing on the channels, and times during which the programs are shown. The program information also includes channel information, such as the channel number and identification information, e.g., ESPN, Disney, WXIA, etc. According to the present invention, the program information additionally includes category information that is indicative of different categories and channels included within each of the categories. By way of example, categories could include ALL, for all available channels; SPORTS, for sports and fitness channels;

FAMILY, for channels that provide family oriented programming; ADULT, for channels providing adult programming; FOOD, for channels that provide programs on cooking, food, and restaurants; and any other categories that could be of interest to the subscriber. A FAVORITES category could also be provided in cable systems 100 that permit the subscriber to program category and channel information. Furthermore, channels could be associated with more than one category, e.g., a primarily sports channel could be included in the categories of SPORTS, NEWS, FAMILY, and ENTERTAINMENT.

Preferably, the terminal 120 periodically downloads program information, including at least programs and times by channel, into memory 250 from the headend 105 (FIG. 1). It will be appreciated that the amount of this information that can be downloaded and the time between downloads vary according to memory size. When, for instance, the cable television system 100 provides access to hundreds or thousands of cable television channels, program information, including the programs, times, and perhaps even the categories for each channel, may be downloaded more often than when the system 100 provides fewer channels. The terminal 120 can also receive updated program information as needed, such as when the cable channel lineup is changed or when the category offerings or channels included in the categories change. One of ordinary skill in the art will understand that various components of the program information, such as user selected category information, could be stored solely in the memory 250, as opposed to the headend 105.

Storage of the category information in the memory 250 can be accomplished in a variety of ways. By way of example, a table in the memory 250 could be stored to minimize the amount of memory required. If each category is assigned a particular bit location in a binary number that is set in size, an n-byte category bitmap could also be stored as follows:

TABLE 1

Category bitmap

| Bit mask (binary) | Category |
| --- | --- |
| 00000001 | Pay-per-view |
| 00000010 | Adult |
| 00000100 | Movies |
| 00001000 | News |
| 00010000 | Sports |
| 00100000 | Family |
| 01000000 | Religious |
| 10000000 | Favorites |

According to the above table, a channel that is represented in the memory 250 as "10110100" would be included in the categories of FAVORITES, FAMILY, SPORTS, and MOVIES.

Program information can be displayed to the subscriber in a number of ways. For instance, the display 235 can be driven to present a conventional program guide that provides automatic scrolling of channels in numerical sequence along with the program names, descriptions, and times associated with the channels. Alternatively, a static display can be provided, and the subscriber can provide commands, such as via the transmitter 240, to scroll through the program information. In either situation, the addition of the hundreds of channels that can be provided in digital systems creates a problem because viewing program information for such a large number of channels can be very time consuming for the subscriber. Additionally, if program information viewing is not automatic, the subscriber may be required to execute a large number of keystrokes to present the information.

The terminal 120 according to the present invention solves this problem by providing a mode in which only program information associated with a user-selected category is presented, by channel, to the subscriber. More specifically, the subscriber can conveniently select a particular category, such as SPORTS or ANIMALS, and only program information associated that that category will be subsequently presented by channel during the time in which the terminal 120 is operating in the "category" mode. Presentation, it will be appreciated, can be accomplished in a number of ways, either at the option of the subscriber, the service provider, or both. When in the category mode, the terminal 120 could, for example, drive the display 235 to present an automatic or manual scrolling of only those channels included in the selected category in a format similar to that of a conventional program guide. Alternatively, a banner of information could be provided only in a particular region of the display 235 so that the subscriber can continue viewing the currently tuned channel. In either case, it will be understood that, once the subscriber has been presented with information about the channels that are included in the selected category, browsing can be further narrowed, such as by time, title, or program theme.

Figure 3:
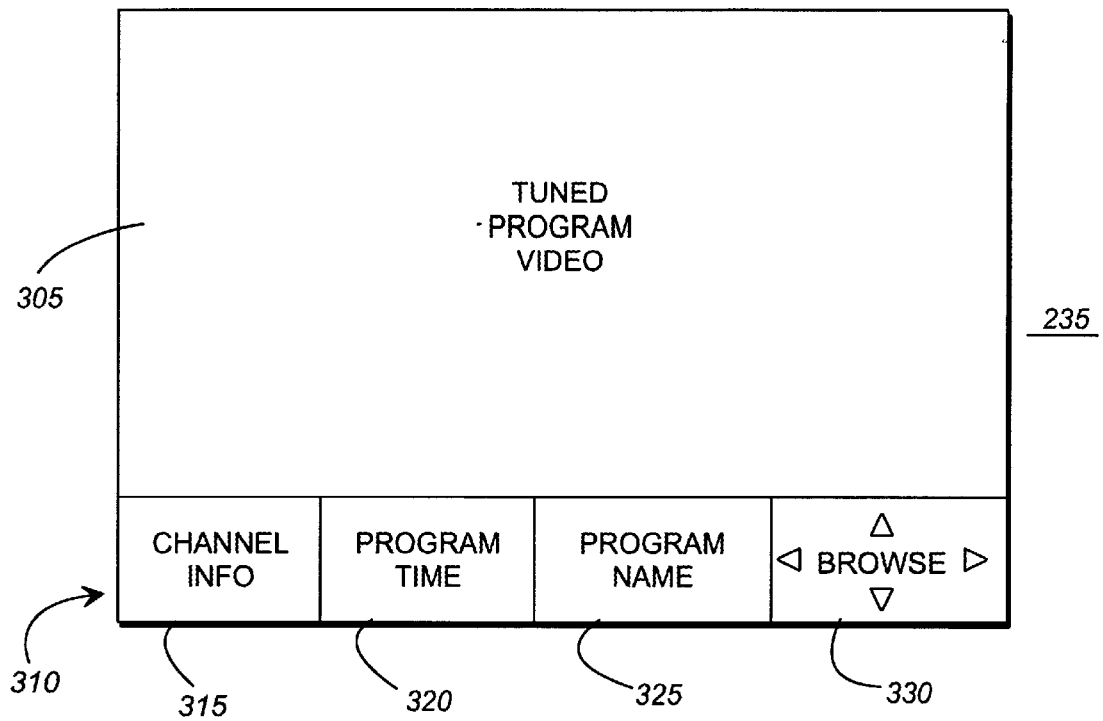
FIGS. 3–9 are illustrations of various browser screens that can be generated for display by the set top terminal of FIG. 2 in accordance with the present invention.
Figure 4:
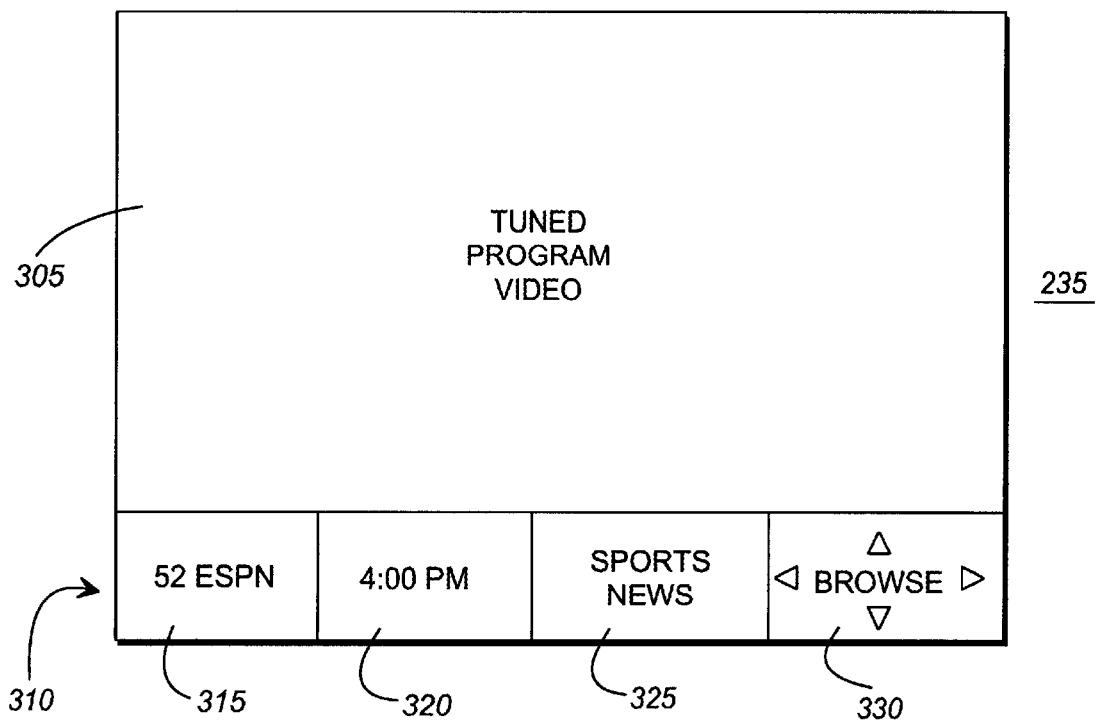
Figure 8:
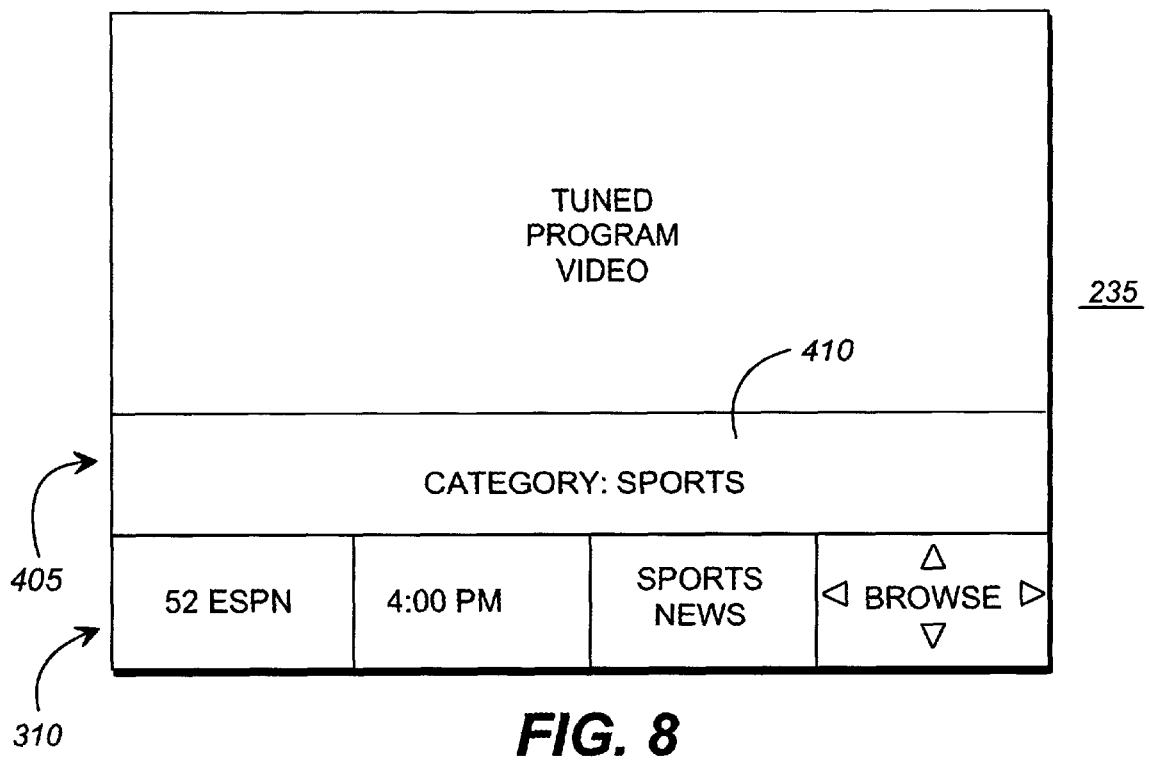
Figure 9:
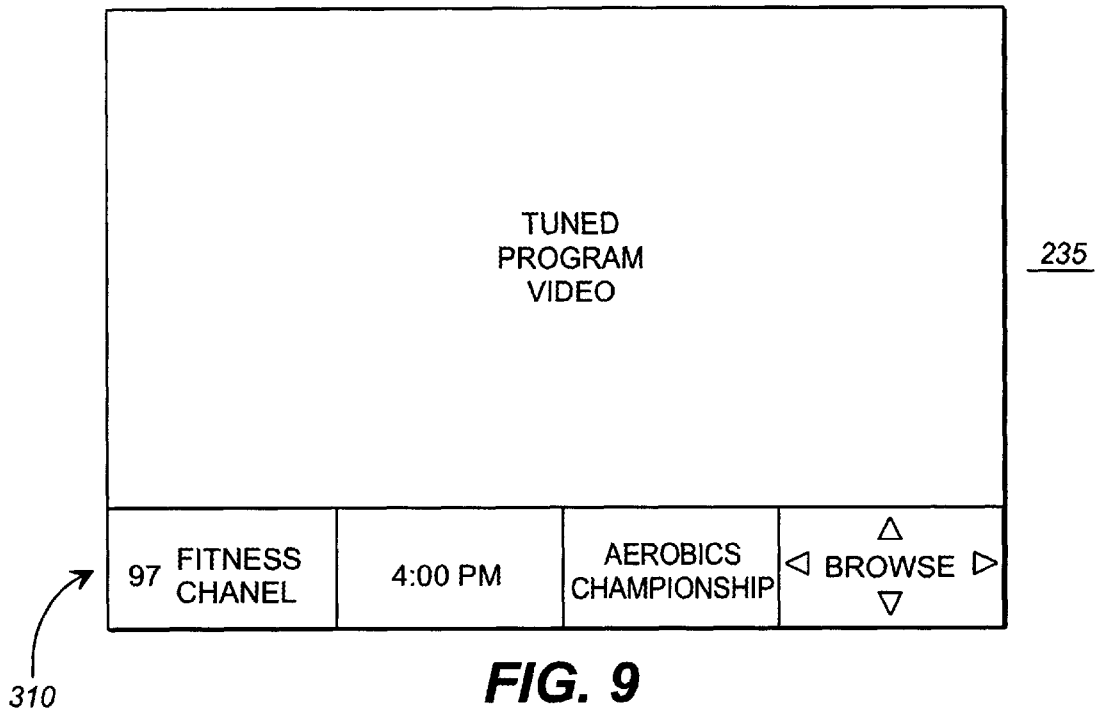
Figure 10:
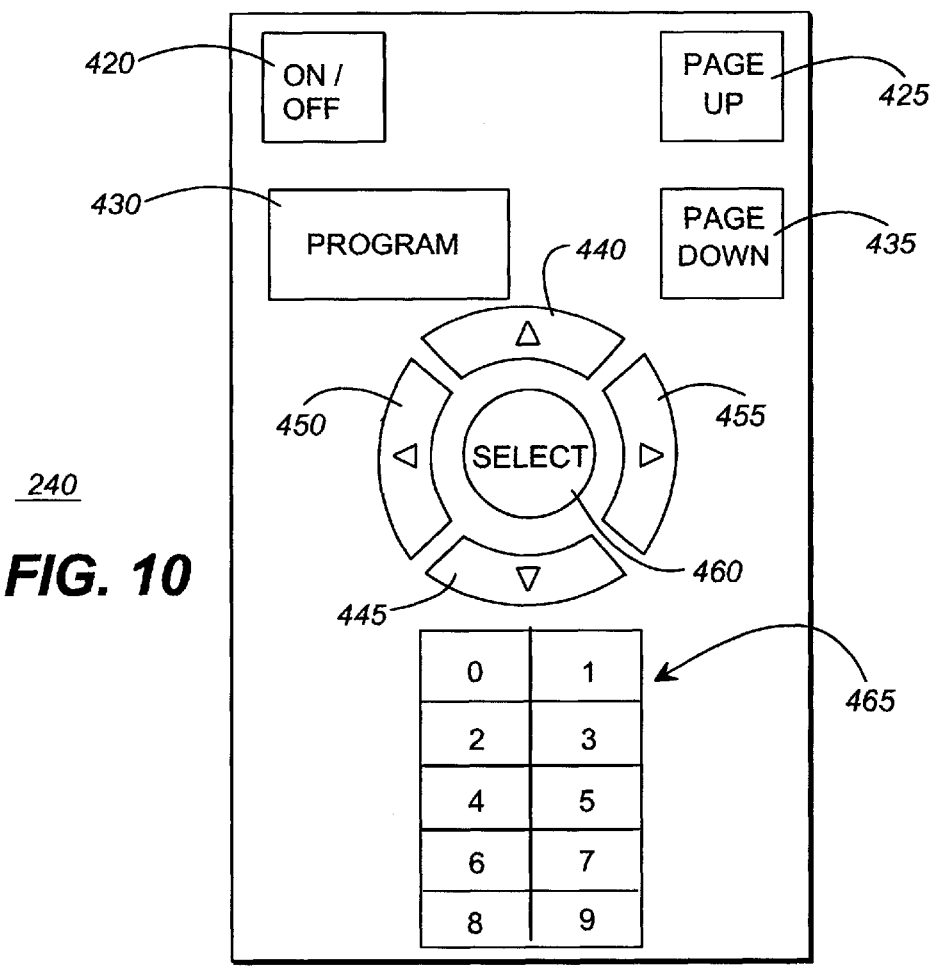
FIG. 10 is a top view of a transmitter, such as a remote control, that can be used by a subscriber to transmit commands to the set top terminal of FIG. 2 in accordance with the present invention.

FIGS. 3–9 illustrate various screens of information, according to the present invention, that could be presented on the display 235 to provide program information to the subscriber. FIG. 10 is a top view of a remote control transmitter 240 that can be used by the subscriber to command the presentation of the various screens. FIG. 3 shows the presentation of a browse banner 310 that can be presented simultaneously with a tuned program, as shown in the larger portion 305 of the display 235. In other words, the subscriber can conveniently browse other channels using the banner 310 while he or she is watching a program of interest. The browse banner 310 could be, for example, presented upon activation of any of the scrolling keys 440, 445, 450, 455 (FIG. 10). The browse banner 310 preferably includes channel information 315, such as a description of the channel and its numerical indicator, program time 320, which could be to the nearest half hour or hour, program name 325, and any other relevant channel/program information. By way of example, and referring to FIG. 4, the browse banner 310 could initially be displayed with information about the currently tuned program, in which case the banner 310 may show that the user is currently watching a program entitled "Sports News" that began at 4:00 p.m. on Channel 52, which is ESPN. Additionally, a "browse" button bar 330 could be displayed to indicate to the subscriber that the browse mode is activated and that browsing in time or by channel can be performed by activating the scrolling keys 440,445,450,455.

Figure 5:
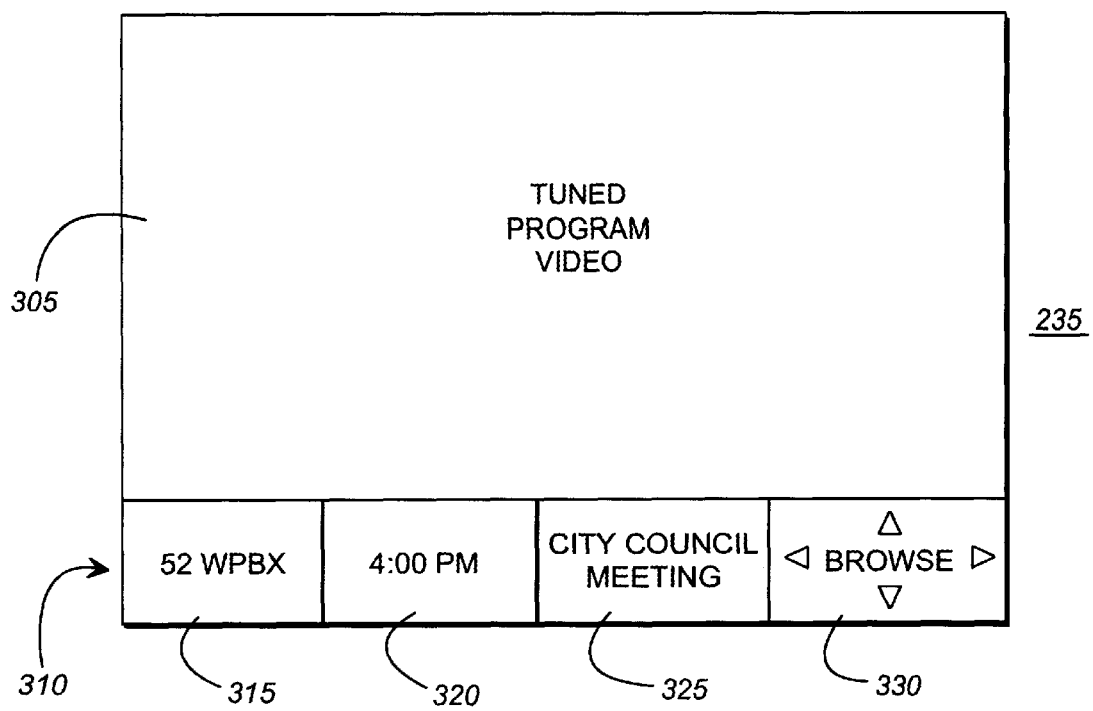
Figure 6:
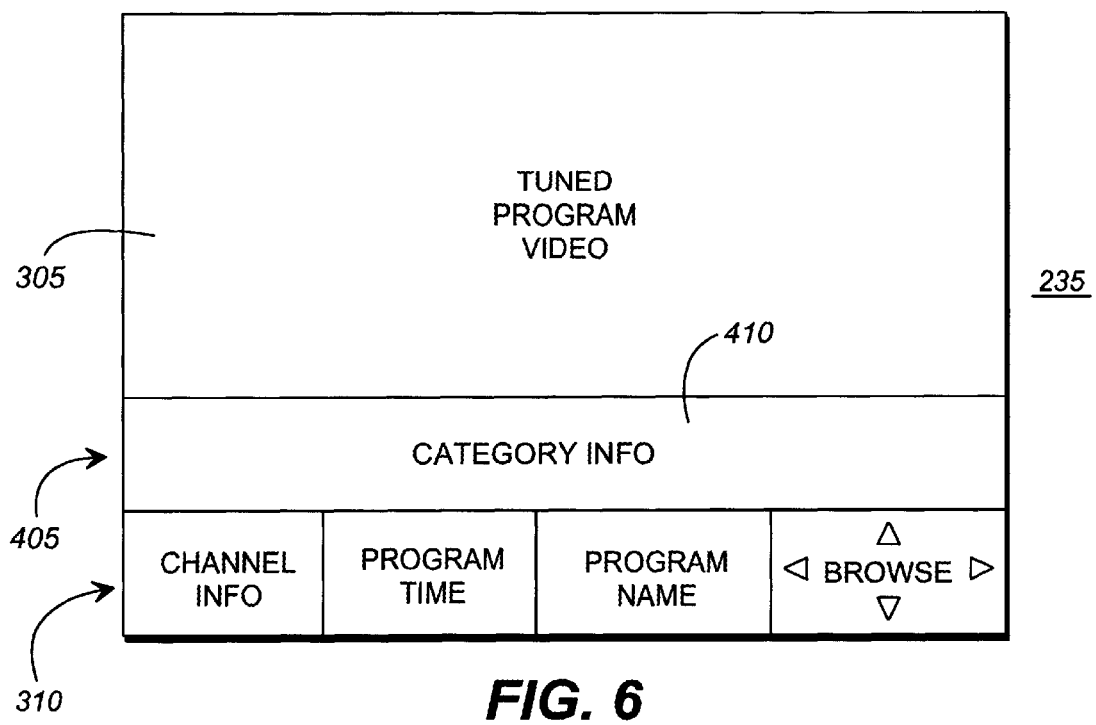
Figure 7:
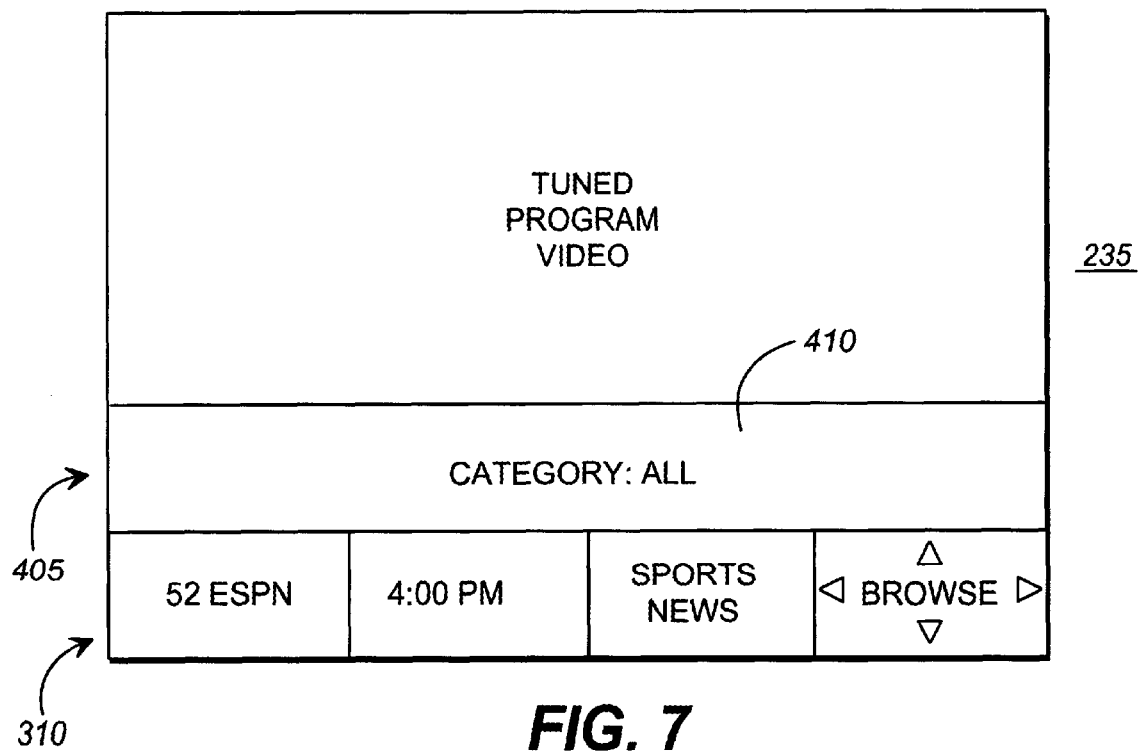

When the subscriber browses by channel, additional channels are displayed in numerical sequence (FIG. 5). As mentioned briefly above, however, the browsing process can be very tedious when a large number of channels are available. Therefore, the terminal 120 of the present invention also provides a "category" mode, which could be set by user actuation of the page up/down keys 425, 435 (FIG. 10). Preferably, the category mode is available during any time when the browse banner 310 is displayed. Upon entry into the category mode, the terminal 120 drives the display 235 to present a category banner 405 that includes category information 410 (FIG. 6) indicative of a category that is currently selected. If no category is selected, a default category of ALL (FIG. 7) may be indicated to the subscriber.

The subscriber can change the selected category by scrolling through the available categories via assigned keys, such as page up/down keys 425, 430, of the remote control transmitter 240. For instance, the subscriber can scroll through the available categories until the category banner 405 shows SPORTS as the selected category (FIG. 8). When the subscriber then begins browsing the program information again, such as by activating the scrolling keys, the program information for the next channel included in the selected SPORTS category will be presented, as shown in FIG. 9.

For purposes of browsing, program information for channels not included in the selected category is skipped so that the subscriber can conveniently display only program information for those channels in which he or she is currently interested. It will be appreciated that the category feature of the present invention allows the subscriber to ignore program information for categories that are not of interest and to quickly locate a particular channel or program without having to view program information for each and every channel provided via the cable television system 100. As a result, the cable television system 100 and terminal 120 according to the present invention provide a means by which the subscriber can quickly locate channels of interest even in a field of hundreds or thousands of channels.

As shown in FIGS. 3–9, the subscriber can easily select a category then browse program information for channels included in the selected category, all without interrupting viewing of a tuned program. Other presentation methods could, however, also be used. For instance, once the category is selected, the subscriber could again select to view program information in a guide-like format. In this case, the program guide information could again be presented on the entire display 235, but could include only program information associated with the selected category. The guide could then be automatically or manually scrolled to show the subscriber only the subset of information associated with the selected category, thereby reducing the amount of time and effort required to locate a particular channel or program.

As mentioned above, user inputs could be provided by a remote control transmitter 240, such as that shown in FIG. 10. Such a transmitter 240 might include an on/off key 420, a program key 430 for inputting programming commands, page up/down keys 425, 435, scrolling keys 440, 445, 450, 455, a select key 460 for selecting a highlighted option, and a numerical keypad 465 for inputting numerical information. However, other input means could alternatively be provided. For instance, a different remote transmitter 240 could be used to highlight and select menu options presented to the subscriber on the display 235, keys on the terminal 120 itself could be used, or commands could be entered via a keyboard, keypad, or computer coupled to the terminal 120.

Figure 11A:
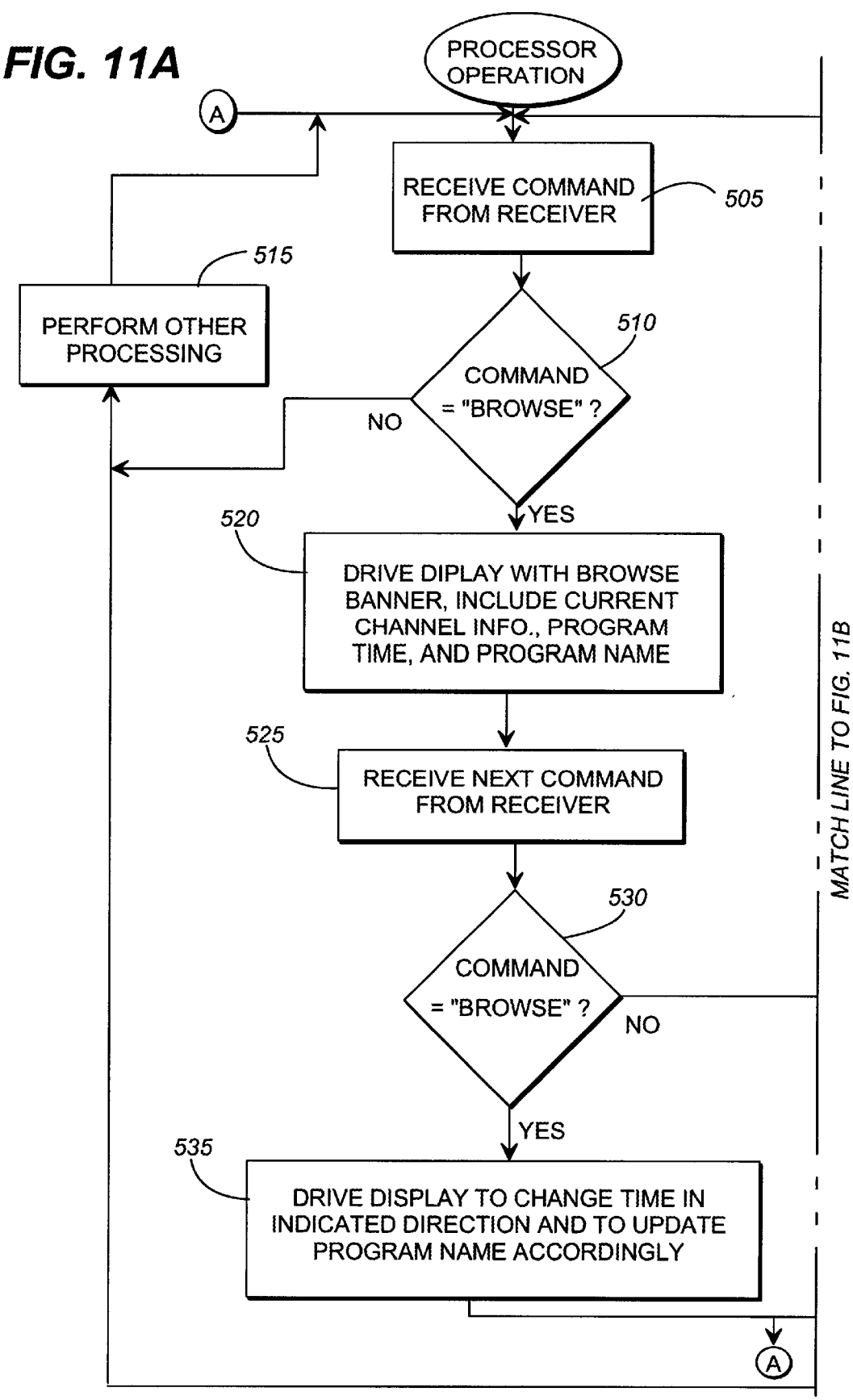
FIG. 11 is a flowchart illustrating an operation of a processor included in the set top terminal of FIG. 2 in accordance with the present invention.

Referring next to FIG. 11, a flowchart illustrates an operation of the processor 210 (FIG. 2) of the terminal 120 for providing category functions according to the present invention. When, at step 505, the processor 210 receives a command from the receiver 220, it determines, at step 510, whether the command is a browse command by referencing the memory 250. If not, other processing indicated by the command is performed, at step 515, in a conventional manner. If the browse command has been received, the display 235 is driven, at step 520, to present the browse banner, including current channel information, program time, and program name for the currently selected category. If no category has been previously selected by the user, the default category is preferably set to ALL. Furthermore, it will be appreciated that, at the option of the subscriber and/or the service provider, the browse banner could either default to ALL or retain knowledge of the selected category, in which case, the browse banner would launch showing channel information associated with a channel included in the selected category.

When, at step 525, another command is received, and the command is determined, at step 530, to be a command to browse in time, the display 235 is driven, at step 535, to change the time on the browse banner in the indicated direction. As mentioned, this could be to the nearest hour or half hour, or browsing in time could automatically advance the subscriber to the time of the next program. In any event, browsing in time may, of course, necessitate a change in program name. When, at step 540, the command is determined to be a command to browse by channel, the browse banner is updated, at step 545, to present the channel information and program name associated with the next channel within the selected category. If, instead, the command is a "display category" command, at step 550, the display 235 is driven, at step 555, to display the category banner that shows the currently selected category. The subscriber can then, at steps 560, 565, change the selected category by scrolling through the available categories using, for example, the page up/down keys 425, 435. The category mode, as well as the browse mode, could be exited by reception of a known command or simply by expiration of a period of time in which no browse or category command is received.

It will be understood that category selection of channel information by the subscriber is not necessarily limited to the time during which the terminal 120 is in the browse mode. Instead, the category could be selected, using any known command or series of commands, prior to viewing any program information by channel. In such a case, if the subscriber selects to be presented with the browse banner, it could appear with the category already selected. If, on the other hand, the subscriber chooses to display a program guide after selection of the channel category, the guide can launch showing only the channels included in the selected category and omitting channels that are not included in the selected category.

Figure 12:
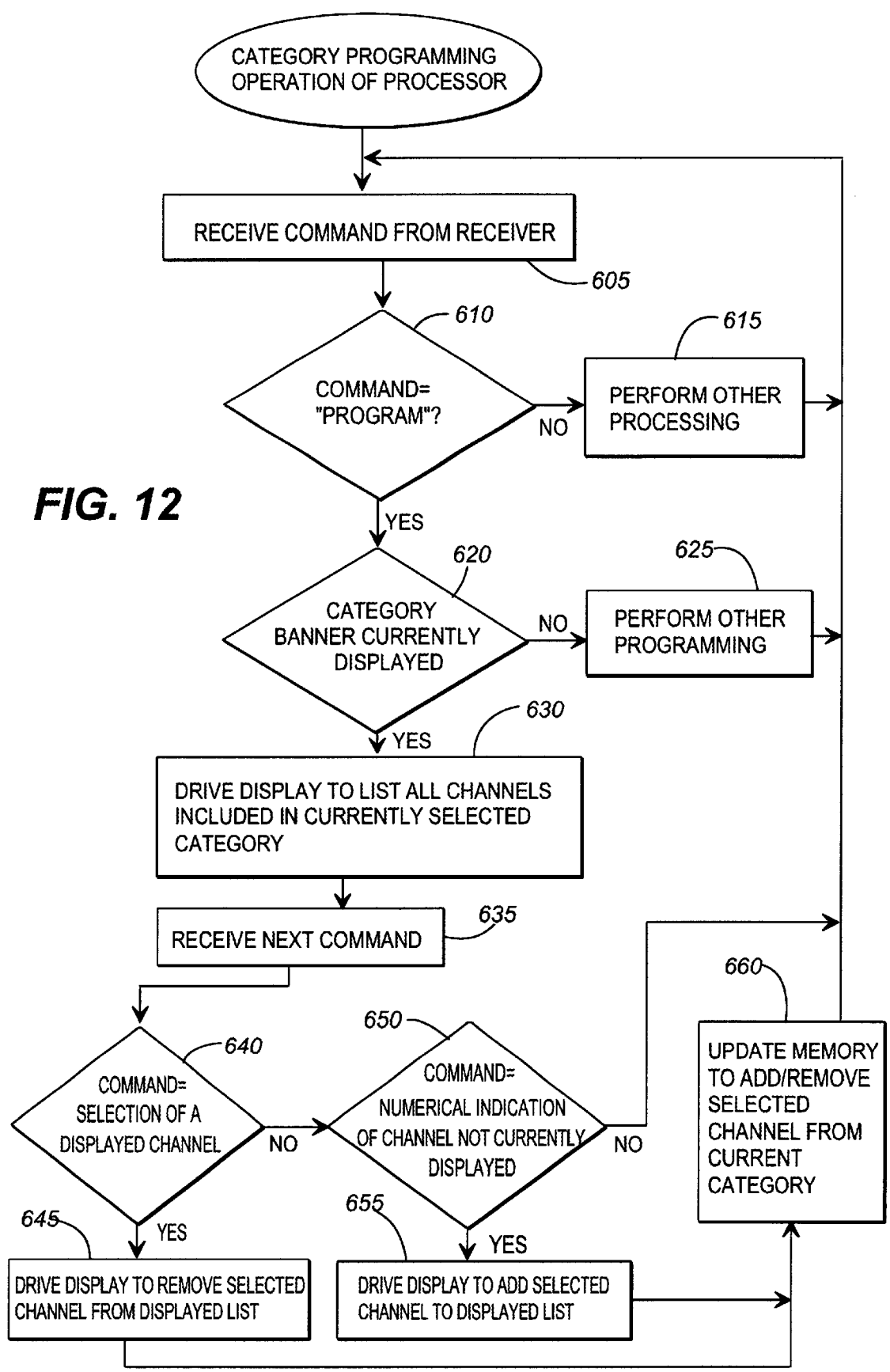
FIG. 12 is a flowchart illustrating a programming operation of the processor included in the set top terminal of FIG. 2 in accordance with the present invention.

FIG. 12 illustrates a method by which channels can be added to or removed from the available categories. When, at step 605, the processor 210 receives a command from the receiver 220, it determines, at step 610, whether the command indicates that programming of the terminal 120 is to be performed. If not, other processing is performed, at step 615, in a conventional manner. When, at step 610, a program command is received, the processor 210 determines, at step 620, whether the command is a category programming command. This could be done, for instance, by determining whether the category banner is currently displayed, in which case activation of the program key 430 (FIG. 10) could be associated with the category programming command. If the command is not a category programming command, another programming function is performed, at step 625. If it is a category programming command, the display 235 is driven, at step 630, to list all channels included in the currently selected category. When, at steps 635, 640, the next command is a command that selects one of the displayed channels, the selected channel is, at steps 645, 660, removed from the displayed list and removed from the category by updating the memory 250. When, at steps 635, 650, the command is a command to add a channel to the category, both the display 235 and the memory 250 are updated, at steps 655, 660, to indicate that the selected channel is now included in the category. Adding a channel to the category could be done, for instance, by activation of the appropriate keys of the numerical keypad 465 (FIG. 10).

It will be appreciated that the methods described in FIGS. 11 and 12 for selecting categories and programming channels included in the categories can be performed in many other ways and that the exact steps illustrated in FIGS. 11 and 12 need not be followed. Category selection and programming could, for instance, be accomplished by typing in a category name via an alphanumeric keyboard, by inserting a data card, such as a smart card or a pc card, into a slot (not shown) of the terminal 120 or of a computer coupled to the terminal 120, or by activating a scrolling pick-list of all available channels and/or categories.

In summary, the cable television system as described above includes subscriber equipment that is capable of receiving a large number of television channels. Therefore, according to the present invention, the channels can be sorted by category, and program information about each of the channels can then be viewed by the subscriber according to category. As a result, programs and channels can be located in a much easier manner than could be done in prior art systems because there has been provided an improved way to view and scan program information in a cable television system that provides a large number of available channels.

What is claimed is:

1. A terminal for providing program information to a display in a cable television system, the terminal comprising:
    a memory for storing the program information including channel information and category information indicative of categories and channels associated with the categories;
    a receiver coupled to the memory for receiving at least one user input indicative of a selection of a category; and
    a processor, coupled to the memory and the receiver and, when in a browse mode, operative for:
        setting, in response a first user input indicative of the selection of a category, a selected category as the category associated with the first user input;
        determining, in response to a second user input indicative of the selection of a category, if the category associated with the second user input is a different category from the category associated with the first user input; and
        setting, in response to the category associated with the second user input being a different category, the selected category to be the category associated with the second user input; and
        activating the display to present only program information associated with channels included in the selected category.

2. The terminal of claim 1, wherein the receiver is operative to receive scrolling related user input and the processor is responsive to the scrolling related user input to cause the scrolling display on the display of only the program information associated with the channels included in the selected category.

3. The terminal of claim 1, wherein the receiver is operative to for receive category display user input and the processor is responsive to the category display user input to cause the display on the display of information indicative of the selected category.

4. A method for providing program information to a subscriber of a cable television system including a terminal for controlling the presentation of the program information, a memory for storing operational parameters, and a receiver for receiving user inputs, the method comprising the steps of:
    storing the program information, including channel information and category information indicative of categories and channels associated with the categories;
    receiving a command indicating that channel information is to be presented;
    driving a display to present only program information associated with channels included in a selected category, including presentation of information about a first channel included in the selected category and, responsive to receiving a scroll command, presentation of information about a second channel included in the selected category; and
    in response to receiving a category change command, changing the selected category within the memory and updating the program information that is presented by the display to reflect that the selected category has been changed.

5. The method of claim 4, further comprising the step of:
    causing the display to present information indicative of the selected category.

6. The method of claim 4, wherein the driving step comprises the step of:
    presenting a program guide on the display, the program guide displaying channel information for channels included in the selected category and omitting channel information for channels not included in the selected category.

7. The method of claim 4, wherein the driving step comprises the step of:
    presenting a browse banner on the display, the browse banner displaying channel information indicative of a first channel included in the selected category and program information indicative of a program name and program time for the first channel.

8. The method of claim 7, further comprising, subsequent to the presenting step, the steps of:
    receiving a category display command; and
    displaying a category banner along with the browse banner, the category banner presenting information indicative of the selected category.

9. The method of claim 8, further comprising, subsequent to the displaying step, the steps of:
    receiving a category change command;
    displaying information indicative of a next category within the category banner; and
    updating the memory to indicate that the next category is the selected category.

10. The method of claim 8, further comprising, subsequent to the displaying step, the steps of:
    receiving a programming command indicative of a selected channel to be removed from the selected category; and
    updating the memory to indicate that the selected channel is included within the selected category.

11. The method of claim 8, further comprising, subsequent to the displaying step, the steps of:
    receiving a programmed command indicative of a selected channel to be removed from the selected category; and
    updating the memory to indicate that the selected channel is no longer included within the selected category.

12. A method for providing program information to a subscriber of a cable television system, the method comprising the steps of:

storing the program information, including channel information and category information indicative of categories and channels associated with the categories;

receiving a command indicating that channel information is to be presented for a selected category;

causing the presentation of a browse banner on a display, the browse banner displaying program information and channel information associated with only the channels included in the selected category, the initial channel information indicative of a first channel included in the selected category and the initial program information indicative of a program name and program time corresponding to the first channel;

receiving a category display command; and causing the presentation of a category banner along with the browse banner, the category banner presenting information indicative of the selected category.

13. The method of claim 12, wherein the step of causing the presentation of a browse banner further comprises the steps of:

presenting information about a first channel included in the selected category;

receiving a scroll command; and presenting information about a second channel included in the selected category.

14. The method of claim 12, further comprising the steps of:

receiving a category change command;

changing the selected category within the memory; and updated the program information that is presented by the display to reflect that the selected category has been changed.

15. The method of claim 12, further comprising the steps of:

receiving a category change command;

displaying information indicative of a next category within the category banner; and updating the memory to indicate that the next category is the selected category.

16. The method of claim 12, further comprising, subsequent to displaying information, the steps of:

receiving a programming command indicative of a selected channel to be added to the selected category; and updating the memory to indicate that the selected channel is included within the selected category.

17. The method of claim 12, further comprising, subsequent to displaying information, the steps of:

receiving a programming command indicative of a selected channel to be removed from the selected category; and updating the memory to indicate that the selected channel is no longer included within the selected category.

18. A method for creating a table associating a plurality of categories with a plurality of channels, the method comprising the steps of:

assigning at least one of the plurality of categories to at least one of the plurality of channels;

assigning a particular bit location within a binary number to each of the plurality of categories;

creating a binary number for the at least one channel, wherein the binary number includes a bit at each particular bit location for each category assigned to the at least one channel; and creating a table associating the binary number for the at least one channel to the at least one channel, wherein the binary number associates the assigned at least one category to the at least one channel.

19. The method of claim 18, wherein the binary number for the at least one channel includes a single bit at a particular location representing a single category assigned to the at least one channel.

20. The method of claim 18, further including the steps of:

creating, following the step of creating a table, a new binary number for the at least one channel to reflect a new assignment of the at least one of the plurality of categories to the at least one of the plurality of channels; and updating the table to associate the new binary number to the at least one channel.

21. The method of claim 18, further including the step of causing a restricted display of program information based on a user selected category and the table, wherein the program information is restricted to the portion of program information for the channels in the table to which the selected category is assigned.

22. The method of claim 18, further including the step of causing a restricted tuning of channels based on a user selected category and the table, wherein the tuning is restricted to the channels in the table to which the selected category is assigned.

* * * * *

UNITED STATES PATENT AND TRADEMARK OFFICE
CERTIFICATE OF CORRECTION

PATENT NO. : 6,243,145 B1  
DATED : June 5, 2001  
INVENTOR(S) : Schlarb et al.

Page 1 of 1

It is certified that error appears in the above-identified patent and that said Letters Patent is hereby corrected as shown below:

<u>Column 8,</u>  
Line 53, delete "removed from" and insert therefore -- added to --.  
Line 60, delete "programmed" and insert therefore -- programming --.

Signed and Sealed this

Fifth Day of February, 2002

Attest:

Attesting Officer

JAMES E. ROGAN  
*Director of the United States Patent and Trademark Office*